W. C. GUILD.
INNER TUBE PROTECTOR.
APPLICATION FILED FEB. 9, 1918.
1,282,688.
Patented Oct. 22, 1918.
2 SHEETS—SHEET 1.
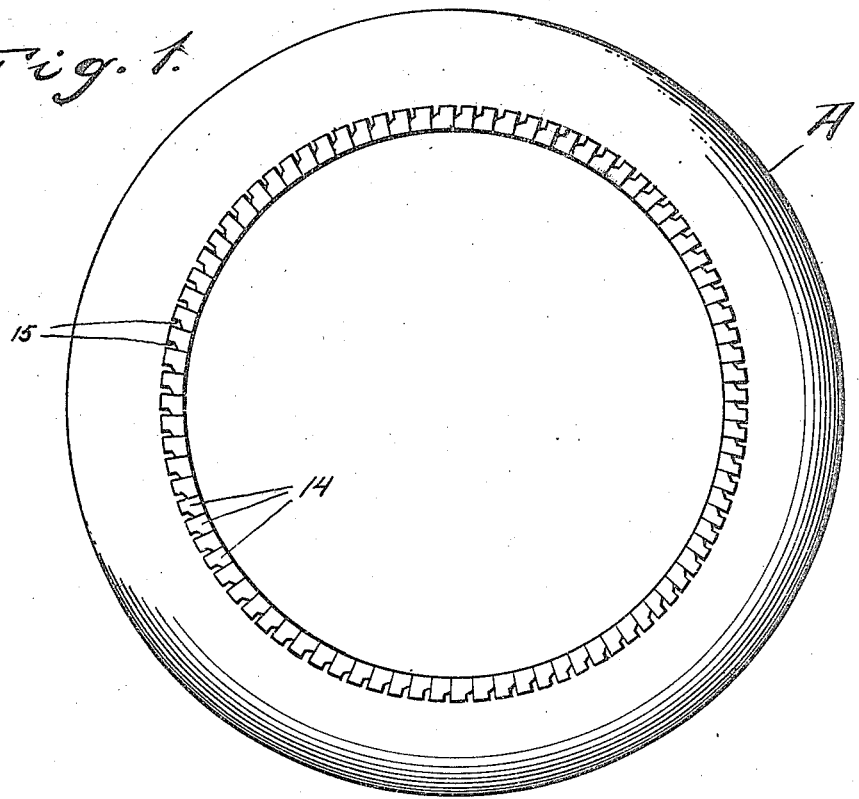
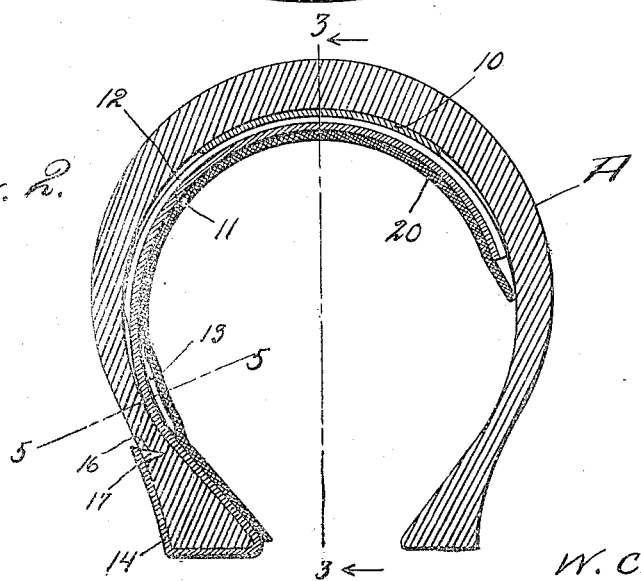

W. C. GUILD.
INNER TUBE PROTECTOR.
APPLICATION FILED FEB. 9, 1918.

1,282,688.

Patented Oct. 22, 1918.
2 SHEETS—SHEET 2.

Witnesses:
J. M. Jester

Inventor
W. C. Guild
By Victor J. Evans
Attorney

UNITED STATES PATENT OFFICE.

WALTER C. GUILD, OF MARIONVILLE, MISSOURI.

INNER-TUBE PROTECTOR.

1,282,688.

Specification of Letters Patent.

Patented Oct. 22, 1918.

Application filed February 9, 1918. Serial No. 216,281.

*To all whom it may concern:*

Be it known that I, WALTER C. GUILD, a citizen of the United States, residing at Marionville, in the county of Lawrence and State of Missouri, have invented new and useful Improvements in Inner-Tube Protectors, of which the following is a specification.

This invention relates to pneumatic tires, particularly to armor therefor, and has for its object the provision of a protective armor permanently associated with the outer casing and disposed between the casing and the inner tube whereby sharp objects penetrating the casing will be deflected and consequently prevented from puncturing the inner tube.

An important object is the provision of an internal armor of this character so constructed as to be yielding whereby the resilience of the tire will not be decreased.

A further object is the provision of such an armor so equipped with protective coverings that chafing of the tube and the casing will be prevented.

Figure 3:
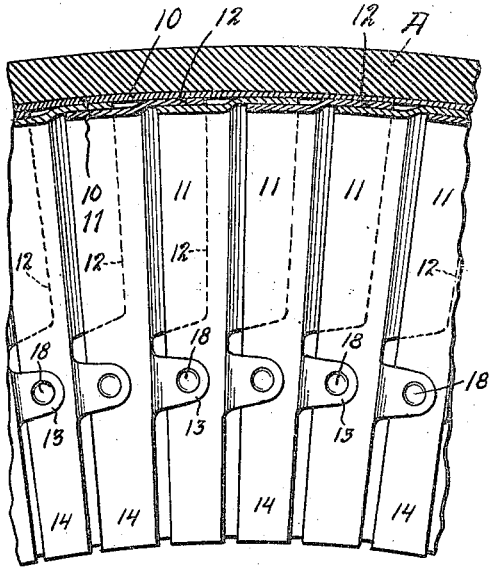
Figure 4:
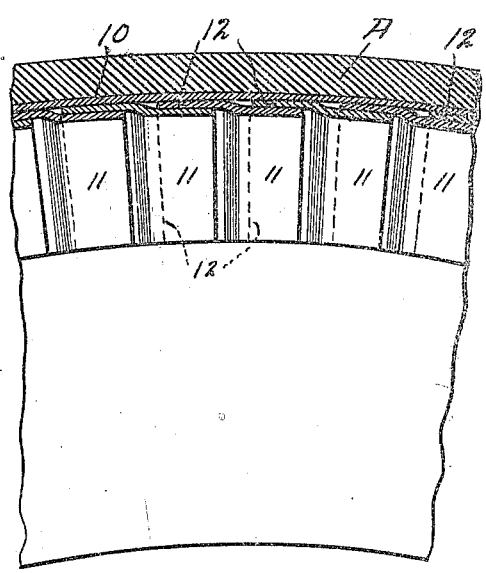
Figure 5:
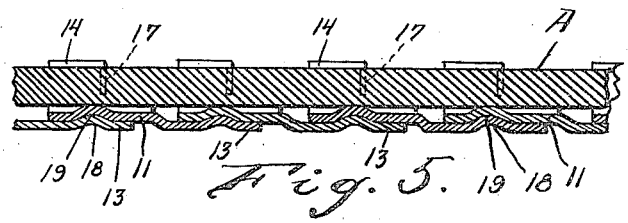
Figure 6:
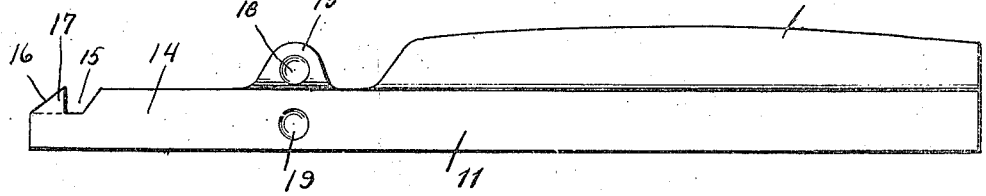

With these and other objects in view such as simplicity, comparative cheapness, thorough efficiency and the general improvement of the art, the invention consists in the construction and arrangement of parts to be hereinafter more fully described and claimed and illustrated in the accompanying drawings in which, Figure 1 is a side elevation of a tire casing having my armor applied thereto, Fig. 2 is a cross sectional view therethrough, Fig. 3 is a longitudinal sectional view on the line 3—3 of Fig. 2, Fig. 4 is a similar view on the same line but looking in the opposite direction, Fig. 5 is a detail longitudinal sectional view on the line 5—5 of Fig. 2, and Fig. 6 is a plan view of a single section before bending into arcuate form.

Referring more particularly to the drawings, A designates a tire casing of any well known or preferred type, though for purposes of illustration I have shown it as being of the kind commonly known as "straight-side."

In carrying out my invention I provide a band 10 disposed upon the inner side of the casing against the tread portion and curved transversely to conform to the curvature of the casing. This band is merely placed within the casing and is not secured thereto. Secured to the casing is a series of interfitting and interlocking spring sections each comprising a strip 11 of spring steel bent into arcuate form, as shown, and having one edge offset as at 12. The offset portion 12 extends entirely to one end of the strip but terminates short of the other end. The same side edge of the strip is provided with an ear offset in a direction opposite to that of the portion 12, the ear 13 being between one end of the offset 12 and the adjacent end, of the strip. From the ear 13 to the adjacent end the strip 11 is reduced in width as shown at 14 and has its end portion notched as shown at 15 and beveled as shown at 16 for providing a tine 17.

After the band 10 is placed in the casing, the curved strips 11 are associated with the casing with the offset 12 of one strip lying against the outer side of the adjacent strip, the strips bearing against the band 10 to prevent chafing of the casing. The ear 13 on each strip bears against the inner face of the adjacent strip. The reduced portions 14 of the strips are passed under the bead at one side of the casing and bent upwardly to lie against the outer side thereof with the tines 17 bent at right angles to the body of the strips and embedded in the casing as shown. Displacement of the strips is thus prevented. The body of each strip and each ear 13 are provided with depressions 18 and 19, respectively, forming interfitting socket-like connections preventing relative creeping of the strips.

After the strips are thus assembled with the casing, the parts are smeared with graphite or other suitable lubricant to prevent excessive friction, after which a layer 20 of asbestos cloth or other suitable material is placed within the inner periphery of the assembled strips as a protector to prevent chafing of the inner tube.

From the foregoing description and a study of the drawings it will be apparent that I have provided a protective armor for application within a tire casing which will efficiently deflect sharp objects penetrating the casing, thereby preventing punctures of the tube. The interlocking strips will also serve to strengthen the casing against danger of "blowouts" and also minimize the risk of "rimcutting" in case the tire is used in an under-inflated condition.

It will be of course understood that I reserve the right to make such changes in the construction and arrangement as will fall within the scope of the matter claimed.

Having thus described my invention, I claim:

1. In combination with a tire casing, an internal protective armor comprising a plurality of similar metallic sections disposed transversely against the inner periphery of the casing and curved to conform thereto, each of said sections having one end free and the other end bent under the bead of the casing and secured upon the outside of the casing, an offset portion on each section overlapping the next adjacent section, and an ear on each section offset oppositely to and in the same direction as said first named offset and engaging the next adjacent section, said ears and said sections being provided at their points of contact with interengaging depressions.

2. In combination with a tire casing, an internal protective armor comprising a plurality of similar metallic sections disposed transversely of and against the inner periphery of the casing and curved to conform thereto, each of said sections having one end free and the other end secured to the casing, and an ear on each section offset and engaging the next adjacent section, said ears and said sections being provided at their points of contact with interengaging depressions.

3. In combination with a tire casing, an internal protective armor comprising a plurality of similar metallic sections disposed transversely against the inner periphery of the casing and curved to conform thereto, each of said sections having one end free and the other end secured to the casing, an offset portion on each section overlapping the next adjacent section, and an ear on each section offset oppositely to and in the same direction as said first named offset and engaging the next adjacent section.

In testimony whereof I affix my signature.

WALTER C. GUILD.

Copies of this patent may be obtained for five cents each, by addressing the "Commissioner of Patents, Washington, D. C."